United States Patent [19]

Cottone

[11] Patent Number: 4,854,792
[45] Date of Patent: Aug. 8, 1989

[54] BRACING AND CUSHIONING SYSTEM AND METHOD FOR TRANSPORTING MASSIVE LOADS

[75] Inventor: Mark A. Cottone, Bloomingdale, Ill.

[73] Assignee: Cougar Package Designers, Inc., Elmhurst, Ill.

[21] Appl. No.: 941,627

[22] Filed: Dec. 15, 1986

[51] Int. Cl.$^4$ .............................................. B61D 45/00
[52] U.S. Cl. .................... 410/118; 410/121; 267/141.1; 267/153; 206/593
[58] Field of Search ....................... 410/42, 47, 44, 49, 410/50, 36, 117, 119, 122, 121, 123, 118, 125, 95, 96, 155; 206/522, 592, 593, 583, 523; 220/23.2; 267/141.1, 153

[56] References Cited

U.S. PATENT DOCUMENTS

| | | |
|---|---|---|
| 994,822 | 6/1911 | Daly . |
| 2,363,256 | 11/1944 | Manning et al. ............. 410/117 |
| 2,620,748 | 12/1952 | Shields ............................. 410/68 |
| 2,674,206 | 4/1954 | Scott ............................... 410/119 |
| 3,131,648 | 5/1964 | Seger .............................. 410/49 |
| 3,229,825 | 1/1966 | Brown, Jr. .................... 410/154 |
| 3,336,069 | 8/1907 | Bayer et al. .................. 410/118 |
| 3,462,027 | 8/1969 | Puckhaber .................... 206/522 |
| 3,575,403 | 4/1971 | Hamel ........................... 410/121 |
| 3,581,674 | 6/1971 | O'Leary ....................... 410/49 X |
| 3,612,301 | 10/1971 | Peacock ........................ 410/118 |
| 3,872,799 | 3/1975 | Dousset ......................... 410/125 |
| 4,008,669 | 2/1977 | Sumrell ......................... 410/47 |
| 4,247,237 | 1/1981 | Brown ........................... 410/121 |
| 4,572,716 | 2/1986 | West ............................. 410/47 |

FOREIGN PATENT DOCUMENTS

| | | | |
|---|---|---|---|
| 2835219 | 2/1980 | Fed. Rep. of Germany ...... | 410/118 |
| 779129 | 11/1980 | U.S.S.R. ................................ | 410/44 |
| 958262 | 9/1982 | U.S.S.R. ............................... | 206/522 |

Primary Examiner—Robert B. Reeves
Assistant Examiner—Frank Williams, Jr.
Attorney, Agent, or Firm—Willian Brinks Olds Hofer Gilson & Lione Ltd.

[57] ABSTRACT

A system and method for bracing and cushioning the impact of movable massive loads during sudden deceleration of a transport vehicle, such as created during humping of railway cars. Resilient elastomeric pads separate adjacent objects of the load with the thickness and density of the elastomeric material chosen to dampen typical impact forces without damage to the objects. The resilient pads are preferably formed with at least one face contoured to envelope the side of an object. Three types of resilient pads are disclosed for use in transporting massive sheet metal coils with one pad adapted for particular use at endwalls, another pad for use between coils, and yet another pad for use between mid-row coils and doorway dunnage.

20 Claims, 2 Drawing Sheets

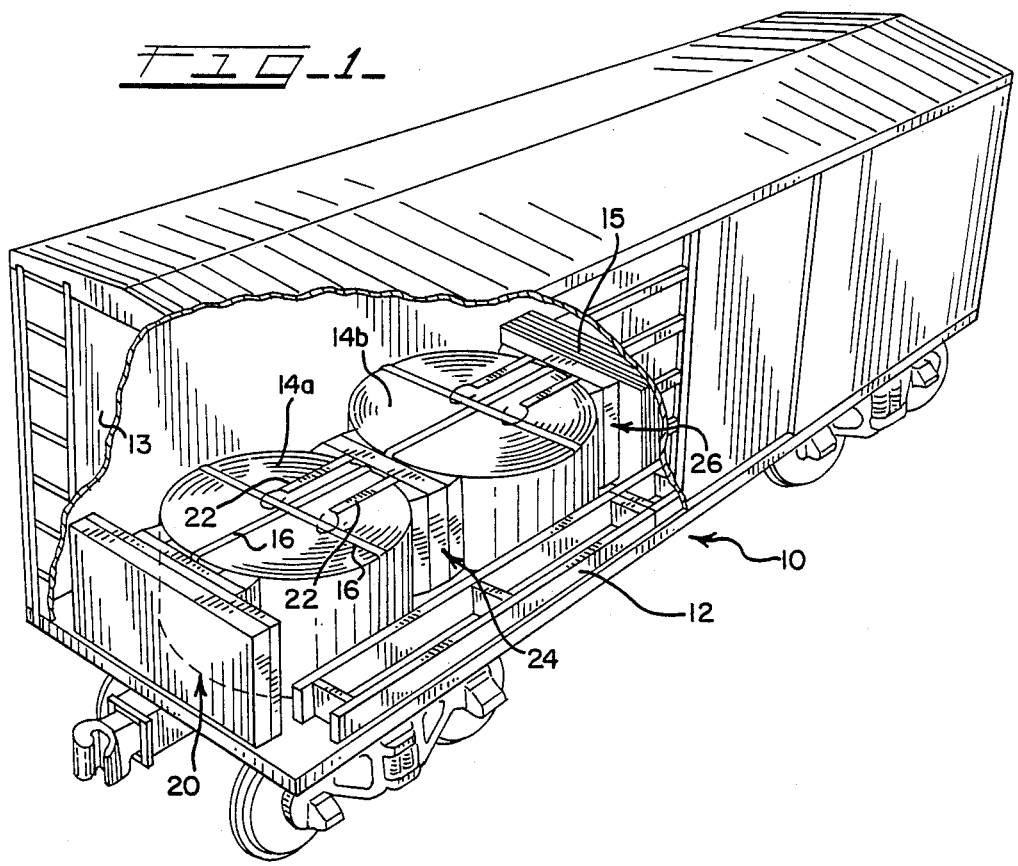
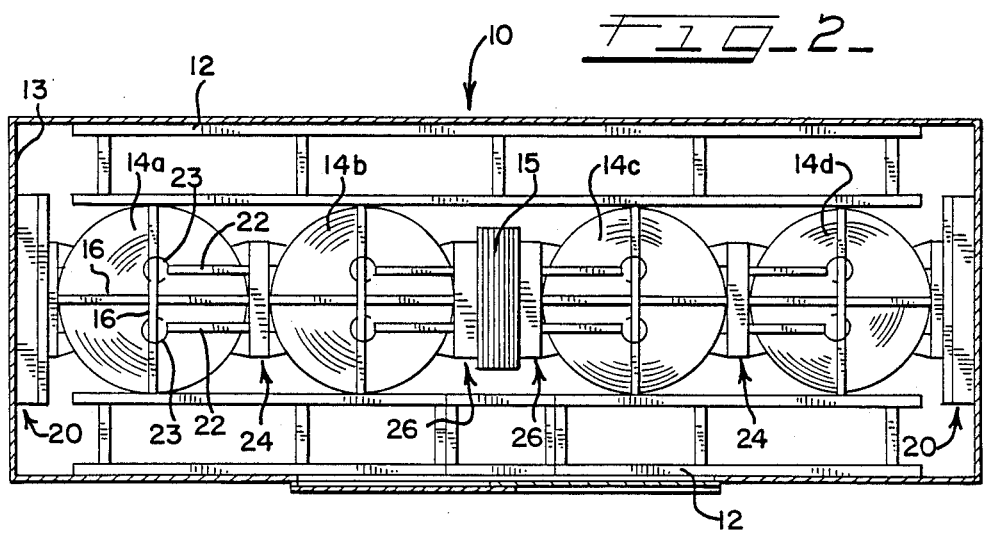

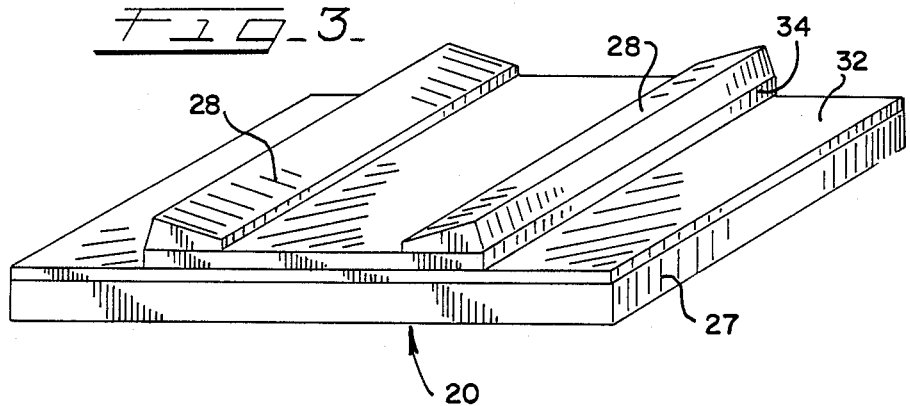
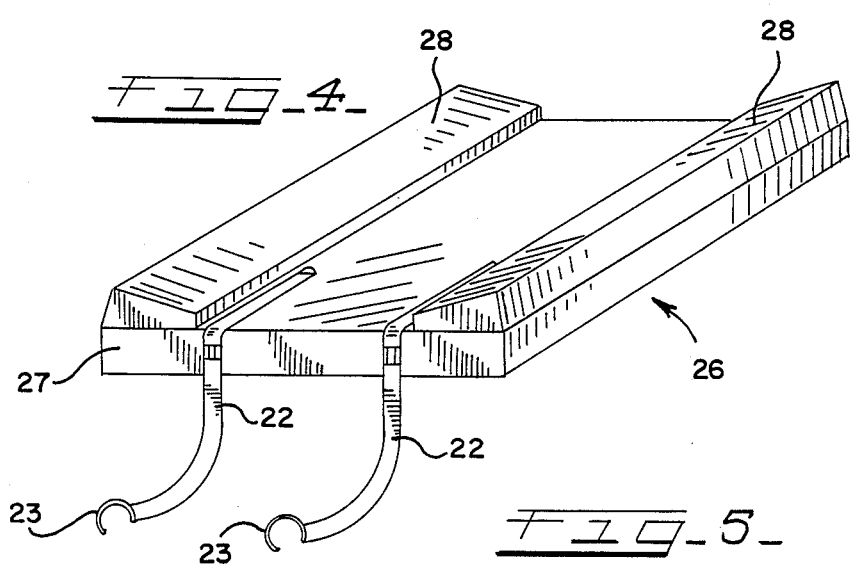
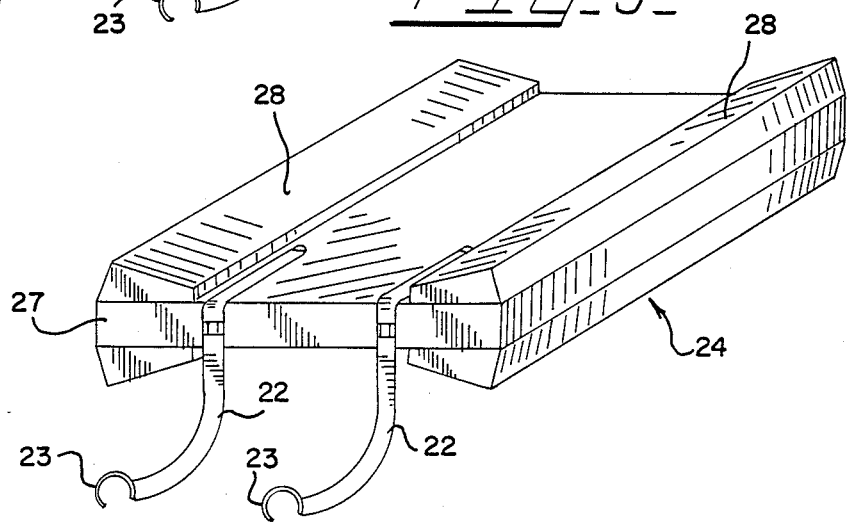

BRACING AND CUSHIONING SYSTEM AND METHOD FOR TRANSPORTING MASSIVE LOADS

FIELD OF THE INVENTION

This invention is generally related to cushioning and securing closely packed loads, and more specifically, is applicable to preventing damage to heavy rolls or coils of sheet metal loaded on railway cars.

BACKGROUND OF THE INVENTION

A considerable impact occurs during the hitching of loaded railway cars to one another, generally termed "humping." During humping, railway cars are accelerated over a light elevation, or hump, so that the car gathers enough speed to be hitched on impact to other cars already coupled and sitting on a track.

This impact causes unrestrained cargo in the railway car to move toward the front (i.e., coupled) end of the railway car. Damage to the cargo can thereby occur if the cargo is not properly braced and/or cushioned. In regard to large and heavy coils or rolls of sheet metal, inadequately secured rolls can hit one another as well as collide with the car interior causing the rolls to become out-of-round. Many shippers have therefore chosen to use non-rail transportation because out-of-round rolls are typically rejected by the customer. These cargo loads have therefore generally been shipped by truck, which can substantially increase the cost of shipping.

Some of those who have nevertheless shipped by rail have loaded the railway cars by a two-step "static loading" method. Each cylindrical roll is placed in the railway car and secured against a rigid spacer; the rigid spacer is then secured in the railway car. Another cylindrical roll is then secured inside the railway car next to the first roll, and another spacer is secured after that roll. This continues for all the rolls in the railway car.

This two-step process has certain drawbacks. It is time consuming and involves excessive work, because the rolls are not loaded in one step. In addition, the spacers used have not typically been successful in preventing compression of the rolls during humping. Finally, because the spacers are rigidly secured, the rolls can suffer damage from contact with the spacers themselves.

Other drawbacks are also present in prior methods of loading railway cars. For instance, some types of spacers crack under the impact of humping. Once cracked, these spacers prove ineffective, requiring replacement or the risk of damage to goods during further transportation.

SUMMARY OF THE INVENTION

It is an object of the present invention to provide an improved system and method for cushioning and bracing closely packed loads for transport. It is a specific object of the invention to provide such a system and method that reduces the impact to heavy rolls of metal flatstock during humping, thereby preventing flattening or denting of the sides of the metal rolls. In addition, damage to the cores of the rolls is prevented. By eliminating damage, insurance claims are reduced and reworking of the rolls is eliminated, saving time and money and making rail transport of rolls more feasible.

Yet another object of this invention is to expedite the loading of a railway car over the present method of loading and blocking each metal roll. This is accomplished by using a "floating" load, and not the present method of "static" loading, i.e., the loading of a roll and then a spacer, stabilizing these, and then loading another roll and another spacer, and continuing this process until completion. Using a "floating" load saves considerable time and money and allows expeditious packing of a railway car before humping.

It is a further object of this invention to provide reuseable and durable cushion spacers that do not require any adaptation of the railway car for use, representing an improvement over previous static, nonreusable or crushable spacers.

To these ends, the invention provides a system and method for bracing and cushioning loads which prevents massive movable objects loaded in a transport vehicle, such as a railway car, from colliding with each other during sudden deceleration, as during humping of a railway car.

The invention generally comprises placing a resilient deformable pad between adjacent relatively movable objects or loads located on the bed of a transport vehicle. The objects are spaced such that the pads fill the gaps between adjacent loads along the longitudinal axis of the vehicle. Resilient end pads are provided between the end object and the endwall of the vehicle.

The pads are preferably of a foam material possessing elastomeric qualities. A cross-linked 4 lb./cubic foot density polyethylene foam has been used to advantage for the pads in an application specifically developed for cushioning and bracing heavy rolls or coils of metal flatstock for transport in railway cars.

In this particular application, a first resilient end pad is provided which has a single contoured face. The contoured face is curved to embrace the curved sides of an end roll of what will be a series of rolls loaded along the longitudinal axis of the railway car. The other face of this end pad is flat and abuts the interior endwall of the railway car.

The end pad also is preferably comprised of a first thick rectangular-shaped foam base layer that is sized to about the same vertical height and width of the flatstock roll. About a 3 inch thickness of the foregoing 4 lb./cubic foot polyethylene foam has been advantageously used for the end pad base layer, which is placed against the endwall in use. The next layer of the pad is of a rigid sheet material, such as 0.75 inch thick plywood that is generally co-extensive with the foam base layer. This rigid sheet serves to better distribute forces over the entire area of the first (base) foam layer. A second foam layer, such as a 1 inch thick sheet of the 4 lb. polyethylene foam, is then provided on the rigid sheet material, with the curved face being built-up on this second foam layer. All of the layers are made integral to yield a unitary pad.

Adjacent rolls in the load are separated by a second resilient pad that has the same thick base layer of foam, with contoured faces formed as front and back sides of the base. These contoured faces embrace the curved sides of adjacent rolls. No rigid sheet layer is used in the presently preferred embodiment of this second pad.

A third resilient pad is also provided for use in the middle of the transport vehicle. Since the rolls will be typically loaded from both ends of the railway car to the middle, a large gap will ordinarily result between the two rolls in the "doorway" area. Dunnage, typically in the form of plywood filler, fills this gap. The third resilient pad is used between this dunnage and an adjacent roll. This third pad preferably comprises the same thick base of foam with a single contoured face, the latter embracing an adjacent roll. Again, no rigid sheet layer is used in the presently preferred embodiment of this third pad.

Commonly used lateral side bar dunnage can be used to complete the bracing of the load. In the practice of this system and method, the rolls are not confined except by the foregoing pads and dunnage. The rolls are thus permitted to "float" on the bed of the vehicle. In the event of an impact (i.e., sudden deceleration), the rolls can slide under the force of inertia. The inertial (or impact) forces are readily absorbed on impact by the system of resilient pads, however, which deform under compression from the rolls and dampen the impact forces generated by the decelerating rolls without transmitting a significant amount of force from roll to roll.

Fabricating the contour of the foregoing polyethylene foam pads is advantageously accomplished by laminating two angular-shaped pieces, generally trapezoidal in cross-section, to the planar face of a generally rectangular cross-section foam layer, such as the thick foam base of the second and third pads. This lamination is accomplished by heating and melting the surfaces of the angular-shaped cushion pieces and the foam base and then placing them together under pressure while melted. The resultant laminated joint is found to be stronger in tensile strength than the original foam material.

The resilient pads can further be advantageously provided with straps attached at one end to the upper end of a pad, with a hook provided on the other end of the strap. The metal rolls are typically bound with metal straps or bindings, two of which ordinarily crisscross the diameter of the roll. The hook of the pad strap attaches to such a mid-roll binder, with the strap sized to suspend the pad in position along the side of the roll. The pads are thus readily located in this manner, enabling the next roll to be loaded without further attention to the suspended pad.

It will be noted that two or more layers of rolls can be built up one atop another in the foregoing manner. It will also be understood that while the invention has been summarized largely in terms of its presently preferred form utilizing pads made up of a 4 lb./cubic foot polyethylene foam material, the invention is not considered to be so limited in material or application.

The foregoing features and advantages of the invention will be further understood upon consideration of the following detailed description of a present embodiment of the invention taken in conjunction with the drawings, in which:

BRIEF DESCRIPTION OF THE DRAWINGS

FIG. 1 is a perspective view partially broken away of a railway car loaded in accordance with the invention;

FIG. 2 is a top plan view of the interior of the railway car of FIG. 1;

FIGS. 3-5 are perspective views of three types of pads made in accordance with the present invention.

DESCRIPTION OF AN EMBODIMENT OF THE INVENTION

Referring to FIG. 1, a railway car 10 is illustrated loaded with cylindrical coils or rolls 14a-14d of steel or other sheet metal flatstock separated by various pads made in accordance with the present invention. At the end of the railway car 10 is first or end pad 20 which separates the wall 13 of the railway car 10 from the first roll 14a. Between end roll 14a and the next adjacent roll 14b is a second pad 24. Pad 24 is attached to the roll 14a by straps 22 which are hooked onto binding straps 16 that surround the rolls. A third pad 26 is attached to roll 14b with similar straps 22, and separates roll 14b from some general dunnage 15, such as sheets of plywood, which fill-in the majority of the gap between rolls in the middle (or doorway) of the railway car 10 (FIG. 2). In typical practice, the railway car will be loaded from each end toward the middle. A substantial gap will thus ordinarily be left in the doorway area of the car between the two "middle" rolls, e.g. rolls 14b and 14c, which is filled by the dunnage 15.

As illustrated in FIG. 2, an identical set of pads 20, 24 and 26 separate rolls 14c and 14d in the remaining half of the railway car 20. Side-bar dunnage 12 braces the rolls along the sides of the railway car 10. The various rolls 14a-14d are butted up against the respective pads 20-26 in loading, with middle pads 26 firmly wedged by the dunnage 15. The rolls 14a-14d are thereby braced in place. The rolls 14a-14d are otherwise free to move or "float", however, along the longitudinal axis of the railway car 10.

FIG. 4 illustrates the middle pad 26. Pad 26 has a thick rectangular cross-section base layer 27 made of a 4 lb./cubic foot density cross-linked polyethylene foam manufactured by Dynamit Nobel of America, Inc., South Holland, Illinois. It is an expanded closed-cell plastic foam produced by a continuous process from a mix of polyethylene resin, blowing agent of Azodicarbonamide, cross-linked by a chemical means to produce a homogenous material which exhibits the following specifications:

| DENSITY (pcf) | ASTM-D-3575 | 2.6–4.4 |
|---|---|---|
| TEAR | ASTM-D-3575 | |
| MD (pli) | | 19.6" min. |
| TENSILE | ASTM-D-3575 | |
| MD (psi) | | 40.0" 81.0" min. |
| % ELONGATION | ASTM-D-3575 | 140" min. |
| MD (%) | | |
| COMPRESSION | ASTM-D-3575 | |
| STRENGTH (psi) | | |
| @ 10% | | 6.8" min. |
| 25% | | 10.8" min. |
| 40% | | 16.6" min. |

The polyethylene foam is produced in rolls typically ½" thick by 72 inches wide by 150 feet long. Thicker sections of foam are achieved by flame lamination of two or more thicknesses together. In this process, flame is introduced to melt the surfaces of the layers to be bonded together, then adjoining these layers while their surfaces are tacky, making a homogeneous thicker section. A 3 inch thick base layer 27 having dimensions of 27 inches by 27 inches is shown.

One face of pad 26 is contoured with a concavity corresponding to the general shape of the side of a cylindrical roll 14a-14d by use of two trapezoidal cross-section pads 28. These contour pads 28 have an outside "leg" (i.e. outboard edge) of approximately 2.5 inches, and are made of the same polyethylene foam as the base layer 27.

The trapezoidal pads 28 are attached to base layer 27 by heating the base layer 27 and trapezoidal pads 28 until they are slightly viscous in the area of joinder, and while still hot, joining the partially melted pads together as a laminate. It has been found that this laminate has an improved tensile strength over the component resilient pads.

The holding straps 22 are then attached to the base layer 27 of pad 26 by suitable means. The straps 27 are provided with hooks 23 that attach to one of the binder straps 16 that criss-cross the middle of the rolls 14a-14d. The straps 22 are sized to suspend the pad 26 along the side of the roll 14 so that the pad extends along substantially the full vertical height of the roll.

Turning now to FIG. 5, pad 24 has a base layer 27 with a pair of trapezoidal pads 28 attached on each face of the base layer by means of the lamination process described above. Pad 24 is made of the same material as pad 26, and the base layer 27 is of the same dimensions as that of pad 26. One face of the pad 24 has holding straps 22 attached thereto.

End pad 20 is also formed from a 3-inch thick polyethylene foam base 27, with dimensions of 27 inches in height by 48 inches wide. A 0.75 inch thick plywood layer 32 is attached to one side of the base layer 27. A 1 inch thick layer 34 of the same polyethylene foam having dimensions of 27 inches by 27 inches is then attached to the plywood layer 32. Trapezoidal pads 28 of the type previously discussed are then attached to the layer 34 to form a contoured face for this side of the pad. The end pad 30 does not have holding straps 22, since the end pad is simply placed in the end of the car 10 with the base 27 against the car endwall 13 (FIGS. 1 and 2). Risers (not shown) made of the same foam may be provided on the bottom of the base 27 to raise the end pad 20 above the level of a skid upon which the roll is carried.

In use, and referring to FIG. 2 in particular, loading of rolls 14a-14d is accomplished as follows. First, an end pad 20 is placed in the railway car 10 against an endwall 13. A cylindrical roll 14a is then loaded and butted against pad 20 compressing it slightly. A double-contour pad 24 is then connected to either the roll 14a or roll 14b using holding straps 22 with hooks 23 attached to binder straps 16. Cylindrical roll 14b is then loaded with the rolls 14a, 14b butted against opposite faces of the pad 24. This procedure is repeated at the other end of the car 10.

Once both ends of the car 10 have been loaded, single-contour middle pads 26 are then attached to the rolls 14b and 14c with the hooks 23 of holding straps 22. Plywood filler dunnage 15 is then placed between the bases 27 of the two opposed pads 26 to secure and brace the load.

When the railway car 10 is humped, all of the pads of the present invention are in place to absorb and dampen the compressive loads created by the sliding rolls 14a-14d, and protect the rolls from damage. When the rolls 14a-14d are removed, any compressed pads substantially return to their original shape for reuse.

It will be understood that the four rolls shown are illustrative, and more rolls will typically be in a row, as the following Example illustrates.

EXAMPLE

A test was run to determine the performance of the foregoing embodiment of the invention in its application as a cushioning system and method for bracing massive rolls or coils of sheet metal. Planned impacts were to exceed AAR standards, but not to exceed 12 m.p.h.

The railway car used for the testing was SOU 9729, and 84 foot tobacco barn equipped with a 30 inch cushioned underframe. The interior of the car was retrofitted with a 19 inch metal frame welded to the car sides to fill lateral voids. The load consisted of 14 aluminum coils on skids, ranging in diameter from 68 inches to 72 inches and weighing a total of 142,500 lbs. Coils were loaded along the centerline of the car with end pads 20 placed at the endwalls and pads 24 between each coil. Six ⅜ inch plywood sheets were used in the doorway to fill the lengthwise void space in the middle of the car.

The pads were measured at their approximate centerpoints for thickness prior to testing and after impact. The results are set forth in the following table. Compression of the pad was measured as the inch-thickness of the pad, and is set forth in the columns under the various humping speeds.

|  | Original Compression of Pad | Miles per hour ("forward" direction) | | | |
| --- | --- | --- | --- | --- | --- |
|  |  | 6.1 | 8.2 | 10.6 | 13.2 |
| End pad (20)A | 4⅜ | 4 | 2 | 2 | 2 |
| Double contoured pad |  |  |  |  |  |
| (24)A1 | 2¾ | 2¾ | 1½ | 1½ | 1½ |
| A2 | 2½ | 2¼ | 1⅜ | 1½ | 1⅜ |
| A3 | 2½ | 2½ | 1½ | 1¾ | 1½ |
| A4 | 2⅜ | 2 | 1 | 1 | ¾ |
| A5 | 3¼ | 2½ | 1½ | 1 | 1 |
| A6 | 3¼ | 3 | 1¼ | 1¼ | 1¼ |
| Middle pad |  |  |  |  |  |
| (26)A7 | 3¼ | 3 | 1⅜ | 1¼ | 1¼ |
| B7 | 3 | 2¾ | 1½ | 1⅜ | 1¾ |
| Double contoured pad |  |  |  |  |  |
| (24)B6 | 3¼ | 2¾ | 1⅜ | 1½ | 1½ |
| B5 | 3 | 2¾ | 1⅜ | 1⅜ | 1⅜ |
| B4 | 2½ | 2½ | 1¾ | 1⅜ | 1⅜ |
| B3 | 2¼ | 2¼ | 2 | 2¼ | 2¼ |
| B2 | 2¾ | 2¾ | 2 | 2¼ | 2½ |
| B1 | 3 | 3¼ | 3 | 3 | 4¼ |
| End pad (20)B | 4¼ | *7⅜ | *26¼ | *27½ | *24¾ |

|  | Original Compression of Pad | Miles per hour ("rearward" direction) | | |
| --- | --- | --- | --- | --- |
|  |  | 8.5 | 10.1 | 11.8 |
| End pad (20)A | 4⅜ | *21 | *30½ | *44½ |

| | | -continued | | |
|---|---|---|---|---|
| Double contoured pad | | | | |
| (24)A1 | 2¼ | 2¾ | 2½ | 2¼ |
| A2 | 2¼ | 7 | 2⅜ | 2¾ |
| A3 | 2¼ | 2½ | 2¼ | 1½ |
| A4 | 2¾ | 1¾ | 1½ | 1 |
| A5 | 3¼ | 1¾ | 1¼ | 1½ |
| A6 | 3¼ | 1¾ | 1⅜ | 1¼ |
| Middle pad | | | | |
| (26)A7 | 3¼ | 1¾ | 1¼ | 1¼ |
| B7 | 3 | 1½ | 1½ | 1½ |
| Double contoured pad | | | | |
| (24)B6 | 3¼ | 1¼ | —** | 1 |
| B5 | 3 | 1¾ | 1¼ | 1 |
| B4 | 2½ | 1 | 1¼ | ½ |
| B3 | 2¼ | 1 | ⅝ | ½ |
| B2 | 2¾ | ¾ | ¾ | ½ |
| B1 | 3 | ¾ | ½ | ½ |
| End pad (20)B | 4¼ | 1¾ | 1⅜ | 1 |

*These distances represent the open space left in the relative "rear" of the car after humping.
**Indicates no measurement available.

The first series of impacts were in a "forward" direction starting at 61., 8.2, 10.6 and 13.2 m.p.h. A visual inspection was made of the load after each impact. No damage to lading was seen at this point in the test. It should be noted that core plugs were not used in coils in the "front" end of car and the core inter-diameter remained at 16".

The second series of impacts were in a "rearward" direction starting at 8.5 m.p.h. A visual inspection of the load revealed no damage to lading. The consensus of opinion was that the fairly large void in the "rear" endwall created after the first series of impacts caused a "slingshot" effect in the reverse direction. The next impact of 10.1 m.p.h. caused pads to compress to their maximum point, creating in effect a rigid load. Still no deformation of coils was noted at this point in the test. The last impact of 11.8 m.p.h. caused extensive damage to coils ranging from out-of-round to flat.

In summary, the system and method of this invention successfully braced and cushioned such a load of metal coils at impact speeds well in excess of maximum typical humping speeds (i.e., about 8 m.p.h.). The test results also showed that the load would be protected from damage in subsequent impacts or rapid decelerations that might occur during coupling of further railway cars or during transport.

The foregoing detailed description of an embodiment of the invention is merely illustrative of the invention, and additional modes, advantages and particulars of this invention will be apparent to those skilled in the art without departing from the spirit and scope of the invention.

I claim:

1. A system for bracing and cushioning the impact of a plurality of movable massive objects arranged in a row in a transport vehicle, comprising a plurality of non-inflatable preformed resilient pads formed of elastomeric material having a base layer with two faces and a concave contour of said elastomeric material formed on at least one face, a pad being located between the sides of adjacent objects in the row and between the objects and interior vehicle endwalls, said pads deforming upon impact and under load to thereby cushion the objects and dampen the force of impact generated by the objects upon sudden deceleration of the transport vehicle, and substantially returning to original shape for reuse upon removal of the load.

2. The system of claim 1 wherein each said pad is formed from an elastomeric material having a density of about 4 lb./cubic foot, a thickness of at least about 3 inches and a length and width approximately the vertical length and width of the objects being braced and cushioned.

3. The system of claim 2 further including means for suspending a pad along the side of an object, said pad suspending means being releasably attached to the object.

4. The system of claim 2 further including a pair of spaced straps attached at one end to an upper end of a pad, the other end of said straps having hooks formed thereon for attachment to said object.

5. The system of claim 1 wherein each said pad is formed from a resilient foam material with an elastic memory and a density of about 4 lb/cubic foot, each said pad having a base layer of at least about 3 inches thick, and a length and width approximately the vertical length and width of the objects being braced and cushioned.

6. The system of claim 5 further including at least three different types of elastomeric pads, comprising:
   a first pad having said base layer, a rigid and substantially unyielding layer formed on a face of said base layer for distributing impact forces over the area of said base layer face, a second layer of said elastomeric material having a thickness of at least about 1 inch formed on a face of said rigid layer opposite said base layer, and a contour formed from said elastomeric material built-up on the outward face of said second layer that is complementarily shaped to the contour of a side of an object such that the object is received in and partially enveloped by said contoured second layer, said first pad forming an end pad for placement at the end of the object row;
   a second pad having said base layer and a contour of said elastomeric material built-up on opposite faces of said base layer, which contour is complementarily shaped to the contour of a side of an object such that respective objects are received in and partially enveloped by said contour on either side of said second pad, said second pad forming an intermediate pad for placement between adjacent objects in the object row; and a third pad having said base layer and a contour of said elastomeric material built-up on a face of said base layer that is complementarily shaped to the contour of a side of an object such that the object is received in and partially enveloped by said contoured face, said third pad forming a middle pad for use between an object and dunnage placed in the object row.

7. The system of claim 6 further including a pair of shaped straps attached at one to an upper end of a pad, the other end of said straps having hooks formed thereon for attachment to said object.

8. A system for bracing and cushioning the impact of a plurality of movable massive objects arranged in a row in a transport vehicle, comprising at least two different types of non-inflatable preformed resilient elastomeric pads, a pad being located between the sides of adjacent objects in the row and between the objects and interior vehicle endwalls, said foam material having an elastic memory and a density of about four pounds/cubic foot, and having a base layer of at least about three inches thick, and a length and width approximately the vertical length and width of the objects being braced and cushioned,
- a first pad having said base layer, a rigid and substantially unyielding layer formed on a face of said base layer for distributing impact forces over the area of said base layer face, a second layer of said elastomeric material having a thickness of at least about 1 inch formed on a face of said rigid layer opposite said base layer, and a contour formed from said elastomeric material built-up on the outward face of said second layer that is complementarily shaped to the contour of a side of an object such that the object is received in and partially enveloped by said contoured second layer, said first pad forming an end pad for placement at the end of the object row; and
- a second pad having said base layer and a contour of said elastomeric material built-up on opposite faces of said base layer, which contour is complementarily shaped to the contour of a side of an object such that respective objects are received in and partially enveloped by said contour on either side of said second pad, said second pad forming an intermediate pad for placement between adjacent objects in the object row,
- said pad deforming upon impact and under load to thereby cushion the objects and dampen the force of impact generated by the objects upon sudden deceleration of the transport vehicle, and substantially returning to original shape for reuse upon removal of the load.

9. The system of claim 8 further including a third pad having said base layer and a contour of said elastomeric material built-up on a face of said base layer that is complementarily shaped to the contour of a side of an object such that the object is received in and partially enveloped by said contoured face, said third pad forming a middle pad for use between an object and dunnage placed in the object row.

10. The system of claim 9 further including means for suspending at least said second and third pads along the sides of respective objects, said pad suspending means being releasably attached to an object.

11. A device for damping loads created by the sudden deceleration of massive and movable coils of sheet metal arranged in a row in a transport vehicle, comprising:
- a non-inflatable reusable preformed resilient pad formed of elastomeric material having a base layer with two faces and a concave contour of said elastomeric material formed on at least one face shaped to generally match the contour of a side of a coil to generally surround the coil side, said pad having a density and thickness adapted to cushion and dampen the force of impact generated by a coil upon sudden deceleration of the transport vehicle.

12. The device of claim 11 further including a pair of spaced straps, each of said straps having two ends, one end of each strap being attached to said pad, the other end of each strap attachable to a coil by a hook fixed to said other end of said strap and hooked onto the coil, said pad being suspended along the side of the coil by said straps.

13. The device of claim 11 wherein said pad further comprises a composite pad formed of a generally rectangularly shaped base layer having two opposite planar a sides, and a pair of contour pads of said elastomeric material attached to each of said planar sides of said base layer, each pair of contour pads being spaced apart to form a concavity with said base layer that generally receives and surrounds the side of a coil, with a coil being received on either side of said composite pad.

14. The device of claim 13 wherein each said pad is formed from a resilient foam material with an elastic memory and a density of about 4 lb/cubic foot, each said pad having a base layer of at least about 3 inches thick, and a length and width approximately the vertical length and width of the objects being braced and cushioned.

15. The device of claim 13 further including a pair of spaced straps, each of said straps having two ends, one end of each strap being attached to said pad, the other end of each strap attachable to a coil by a hook fixed to said other end of said strap and hooked onto the coil, said pad being suspended along the side of straps.

16. A bladderless device for damping loads created by the sudden deceleration of massive movable coils of sheet metal arranged in a row in a transport vehicle, comprising:
- a reusable preformed resilient pad formed of elastomeric material having a base layer, a rigid and substantially unyielding layer formed on one face of said base layer for distributing impact forces over the area of said base layer face, a second layer of said elastomeric material formed on a face of said rigid layer opposite said base layer, and a concave contour formed from said elastomeric material built-up on the outward face of said second layer, said contour being shaped to generally match the contour of a side of a coil to generally envelope the coil side, said layers of elastomeric material having a density and thickness adapted to cushion and dampen the force of impact generated by a coil upon sudden deceleration of the transport vehicle, said pad in use being placed with its base layer against a vehicle verticle surface with said contoured side generally enveloping the side of an adjacent coil.

17. The device of claim 16 wherein said pad is formed from a resilient foam material with an elastic memory and a density of about 4 lb./cubic foot, said pad having a base layer of at least about 3 inches thick, a second layer of at least about 1 inch thick and a length and width approximately the vertical length and width of the object.

18. The device of claim 17 wherein said rigid layer is formed of plywood having a thickness of about 0.75 inches and is approximately co-extensive in length and width with said base layer.

19. A method for being bracing and cushioning a plurality of massive movable objects arranged in a row in a transport vehicle, such as a railway car, having two endwalls, comprising the steps of:

providing two types of pads formed from a resilient foam material with an elastic memory and a density of about 4 lb./cubic foot, each said pad having a base layer of at least about 3 inches thick and a length and width approximately the vertical length and width of the objects being braced and cushioned, a first such pad having said base layer, a rigid and substantially unyielding layer formed on a face of said base layer for distributing impact forces over the area of said base layer face, a second layer of said elastomeric material having a thickness of at least about 1 inch formed on a face of said rigid layer opposite said base layer, and a contour formed from said elastomeric material built-up on the outward face of said second layer that is complementarily shaped to the contour of a side of an object such that the object is received in and partially enveloped by said contoured second layer, a second such pad having said base layer and a contour of said elastomeric material built-up on opposite faces of said base layer, which pad contours are complementarily shaped to the contour of a side of an object such that respective objects are received in and partially enveloped by said pad contour on either side of said second pad, said second pad including means for suspending said pad along the side of an object, said pad suspending means being releasably attachable to the object;

placing a first pad between an endwall and a first loaded object loaded at each end of the car;

attaching a second pad to one of said first loaded object and a second loaded object, and placing said second loaded object against said second pad with said second pad between said first and second loaded objects; and attaching additional second pads to one of said second loaded object and further consecutively loaded objects in completion of the row such that each object in the row is spaced from an adjacent object by a second pad.

20. The method of claim 19 further including the steps of:

providing a third pad having said base layer and a contour of said elastomeric material built-up on a face of said base layer that is complementarily shaped to the contour of a side of an object such that the object is received in and partially enveloped by said contoured face, said third pad further including said pad suspending means; and placing said third pad between an object and dunnage placed in the middle of the row.

* * * * *

UNITED STATES PATENT AND TRADEMARK OFFICE
CERTIFICATE OF CORRECTION

PATENT NO. : 4,854,792
DATED : August 8, 1989
INVENTOR(S) : Mark A. Cottone

It is certified that error appears in the above-identified patent and that said Letters Patent is hereby corrected as shown below:

IN THE ABSTRACT

On the cover page, column 2, line 8 of the Abstract, please delete "resilent" and substitute therefor --resilient--.

IN THE BACKGROUND OF THE INVENTION

In column 1, line 16, please delete "light" and substitute therefor --slight--.

IN THE SUMMARY OF THE INVENTION

In column 2, line 55, before "pad" please delete --.--.

IN THE DESCRIPTION OF AN
EMBODIMENT OF THE INVENTION

In column 3, line 68, before "first" please insert --a--.

In column 5, line 4, please delete the second occurrence of "27" and substitute therefor --22--.

In column 6, line 15, please do not start a new paragraph. This is a continuation of the previous paragraph.

UNITED STATES PATENT AND TRADEMARK OFFICE
CERTIFICATE OF CORRECTION

PATENT NO. : 4,854,792
DATED : August 8, 1989
INVENTOR(S) : Mark A. Cottone

It is certified that error appears in the above-identified patent and that said Letters Patent is hereby corrected as shown below:

In column 7, line 23, please delete "61." and substitute therefor --6.1--.

In claim 2, column 8, line 26, please delete "approximately" and substitute therefor --approximating--.

In claim 5, column 8, line 41, please delete "approximately" and substitute therefor --approximating--.

In claim 7, column 9, line 10, please delete "shaped" and substitute therefor --spaced--.

In claim 8, column 9, lines 22 and 23, please delete "approximately" and substitute therefor --approximating--.

In claim 14, column 10, line 32, please delete "approximately" and substitute therefor --approximating--.

In claim 17, column 11, line 1, please delete "approximately" and substitute therefor --approximating--.

In claim 19, column 11, line 7, please delete "being".

UNITED STATES PATENT AND TRADEMARK OFFICE
CERTIFICATE OF CORRECTION

PATENT NO. : 4,854,792

DATED : August 8, 1989

INVENTOR(S) : Mark A. Cottone

Page 3 of 3

It is certified that error appears in the above-identified patent and that said Letters Patent is hereby corrected as shown below:

In claim 19, column 11, line 15, please delete "approximately" and substitute therefor --approximating--.

Signed and Sealed this

Seventh Day of April, 1992

*Attest:*

HARRY F. MANBECK, JR.

*Attesting Officer*     *Commissioner of Patents and Trademarks*